United States Patent [19]
Filz

[11] 3,870,813
[45] Mar. 11, 1975

[54] TWO STAGE INTERIOR-EXTERIOR BLANCHING PROCESS

[75] Inventor: William F. Filz, Portland, Oreg.

[73] Assignee: North Pacific Canners & Packers, Inc., Portland, Oreg.

[22] Filed: Jan. 25, 1974

[21] Appl. No.: 436,528

Related U.S. Application Data

[62] Division of Ser. No. 271,243, July 13, 1972, Pat. No. 3,804,000, which is a division of Ser. No. 83,767, Oct. 26, 1970, Pat. No. 3,707,384.

[52] U.S. Cl............................. 426/509, 426/510
[51] Int. Cl............................................ A23l 1/00
[58] Field of Search ............... 426/509, 510, 511, ; 99/532, 533, 516, 646

[56] References Cited
UNITED STATES PATENTS

| | | | |
|---|---|---|---|
| 1,269,843 | 6/1918 | Nelon | 99/103 |
| 1,485,253 | 2/1924 | Devlin | 99/256 |
| 1,969,730 | 8/1934 | Daughters | 99/8 |
| 3,707,384 | 12/1972 | Filz | 426/209 |

Primary Examiner—A. Louis Monacell
Assistant Examiner—Hiram H. Bernstein
Attorney, Agent, or Firm—Klarquist, Sparkman, Campbell, Leigh, Hall & Whinston

[57] ABSTRACT

The method of uniformly blanching an ear of corn by blanching the kernels by an exterior operation and independently blanching the pith.

1 Claim, 6 Drawing Figures

TWO STAGE INTERIOR-EXTERIOR BLANCHING PROCESS

DESCRIPTION

The present application is a division of my copending application entitled "Injection Blanching Apparatus," Ser. No. 271,243, filed July 13, 1972 and now U.S. Pat. No. 3,804,000, which in turn was a division of my earlier filed application entitled "Injection Blanching Method and Apparatus," Ser. No. 83,767, filed Oct. 26, 1970, now U.S. Pat. No. 3,707,384, granted Dec. 26, 1972, title changed by Patent Office to "Blanching Corn By Internal Fluid Injection."

The present invention relates to a method for uniformly blanching ears of corn.

At present it is the standard practice to blanch ears of corn by subjecting them to a hot fluid at a sufficient temperature to blanch the kernels. However, if the temperature is high enough to materially affect the enzymic activity of the pitch or core of the ear, it overblanches of cooks the kernels, giving them an undesired texture and impairs the flavor, resulting in a starchy taste. On the other hand, if the temperature is maintained at a level sufficient to avoid overblanching, heat transferred to the core is insufficient to materially affect its enzymic activity. Thus, the enzymic activity in the core or pith continues after the blanching step and frequently gives a peculiar and undesirable taste to the kernels. Spreading of this undesirable taste seems to be accelerated when the blanched ears are subsequently cooked by the housewife.

An object of the present invention is to provide a method overcoming the above difficulties and particularly to provide a method of uniformly blanching ears comprising blanching the kernels by an exterior operation and independently blanching the pith or core area by an internal blanching operation.

Various other objects will be apparent from the following description taken in connection with the accompanying drawings, wherein.

Referring now in detail to the drawings there is shown an apparatus for carrying out the method of the invention.

Figure 1:
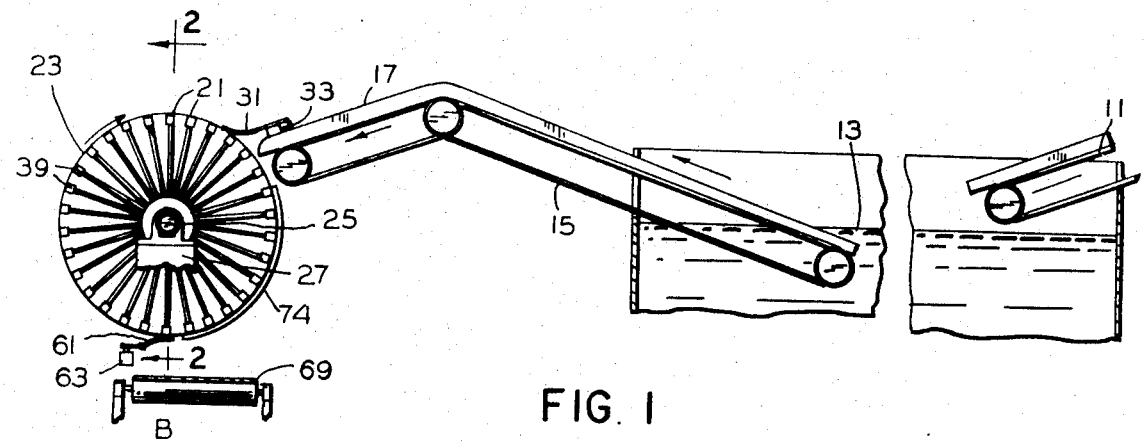
FIG. 1 is a side, partly diagrammatic view of an apparatus for carrying out the method of my invention.

In FIG. 1, the exterior blanching step is shown as being carried out by apparatus disclosed in diagrammatic form. The ears to be blanched are usually trimmed at both ends before being blanched. These ears are fed by an infeed conveyor 11 into a bath 13 of hot water at a blanching temperature in which the kernels are sufficiently blanched to stop their enzyme activity, but not carried sufficiently far as to adversely affect the texture, condition or flavor of the kernels. Instead of a water bath, the ears may be conveyed through a steam chamber to accomplish the same result.

A conveyor 15 removes the ears from the bath 13 and delivers them in single file fashion to a chute 17. Chute 17 delivers the ears of corn with their axes at right angles to the length of the conveyor to deposit the ears in single file fashion in successive pockets 21 of drum 23. The drum is mounted on a hollow spindle 25, which is supported by bearings 27 for rotary movement.

There is a hollow or tubular, laterally perforated needle 29 (FIG. 2) associated with each of the pockets 21, each pocket having a needle guide hole or tube 31 formed in the drum through which the needle passes.

Figure 4:
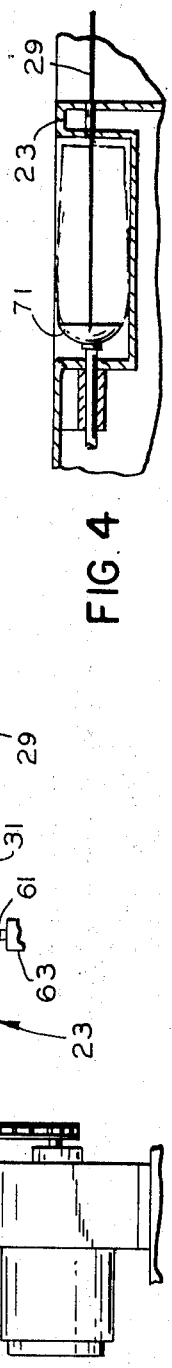
FIG. 4 is an enlarged, vertical sectional view of an apparatus forming an alternate embodiment of the ivnention.

Each needle has plural holes spaced along the portion thereof in the ear. The arrangement is such that as each ear is deposited in its pocket 21, a sensing lever or feeler 31 (FIG. 1) is shoved to actuate a control 33, which can be in the form of a microswitch, to actuate an air valve 35 (FIG. 2) in a line 37 to allow compressed air to be delivered to the cylinder 39, which has a piston 41 carrying the needle 29. This action forces the needle to the left so that it passes through the guide hole 31 and into the core or pith area 45 of the cob 46 of the ear of corn, as shown in FIG. 4, whereupon hot water is injected into the pith area 45 of the ear 47 through the needle 29. The water is delivered to the needle through a flexible hose 51 leading to a hot water chamber 53, which is a composite part of the spindle 25.

The water pressure is sufficient to force the water through the pith and root zone of the kernels and outwardly between the kernels.

Figure 2:
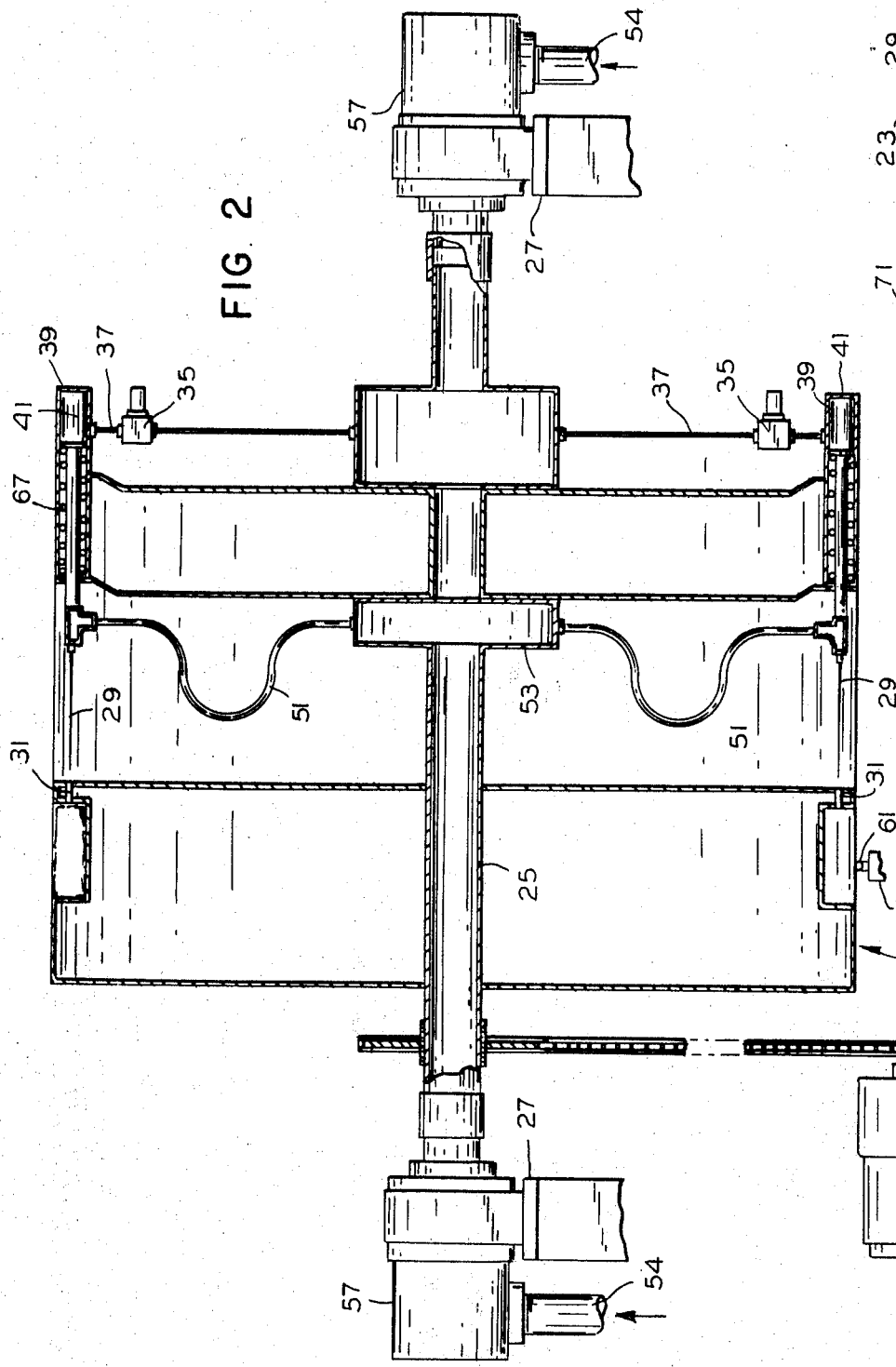
FIG. 2 is a vertical sectional view taken along line 2—2 of FIG. 1.

The hot water is delivered to the left hand portion of the spindle, as viewed in FIG. 2, through a rotary union or coupling 57 which is connected to a source of hot water under pressure (not shown) by a stationary pipe 54.

The needle 29 acts to retain the ear of corn in the pocket 21 as the drum 23 is slowly rotated so that the pithy core of the ear of corn is subjected to the hot water issuing from the perforations in the needle, so that by the time the ear reaches position B, as shown in FIG. 1, the enzymic activity of the pith area has been halted. There is a sensing lever or feeler 61, which is actuated upon engagement with an ear, to actuate a control 63 to reverse the valve 35, whereupon a compression spring 67 (FIG. 2) around the piston 41 retracts the needle, whereupon the processed ear is dropped from the pocket onto a conveyor 69 (FIG. 1). A double acting cylinder could be used if desired.

While the apparatus shown blanches the kernels first, and then the pith, the reverse operation is also satisfactory.

The operating conditions in one installation were as follows: the water was injected into the core of an ear with a pressure of between 80 – 90 pounds per square inch and at a temperature just below boiling, around 205° – 210° F. The water injection continued for a few seconds, usually 4 – 5 seconds. Then the ears were moved through a hot water bath at a temperature of around 205° – 209° F. for about 3 – 4 minutes to blanch the kernels. Next the ears were passed through a cooling water spray. Afterward they were immersed in a cold water tank to halt the action of the heat.

The above conditions can be varied somewhat depending on the condition and maturity of the ears, but if carried out properly, the kernels are firm and resilient to the touch, not soft and flabby, and the taste is sweeter than otherwise would be the case. One variation of the above procedure would be to shorten the kernel blanching time somewhat when the blanching is carried out with steam.

EMBODIMENT OF FIG. 4

An alternate embodiment of the blanching apparatus is shown in FIG. 4 and includes a suction cup 71 in each pocket to engage an end of an ear of corn and apply suction to the same just after the hot water supply is stopped. This lowers the pressure around the ear and causes the hot water in the ear to flash off to not only get rid of the hot water but also to substantially cool the ear and stop any further blanching or cooking of the same.

Retaining guide rods or shield, like a shield 74 (FIG. 1), hold the ears in the pockets until the 6 o'clock discharge position is reached. The suction is cut off from each cup 71 at about the 5:30 or 6 o'clock position, and the needles are withdrawn at the 6 o'clock position.

EMBODIMENT OF FIG. 5

Figure 3:
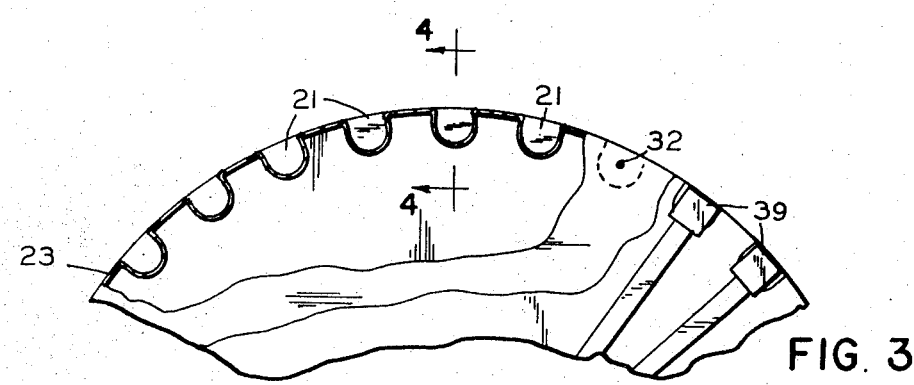
FIG. 3 is an enlarged, fragmentary, partially sectional side elevation view of the apparatus of FIG. 1.
Figure 5A:
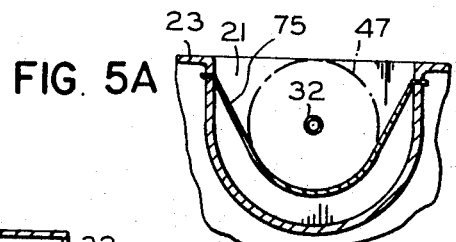
FIG. 5A is a fragmentary cross sectional view showing a support for the smaller end of an ear of corn.
Figure 5:
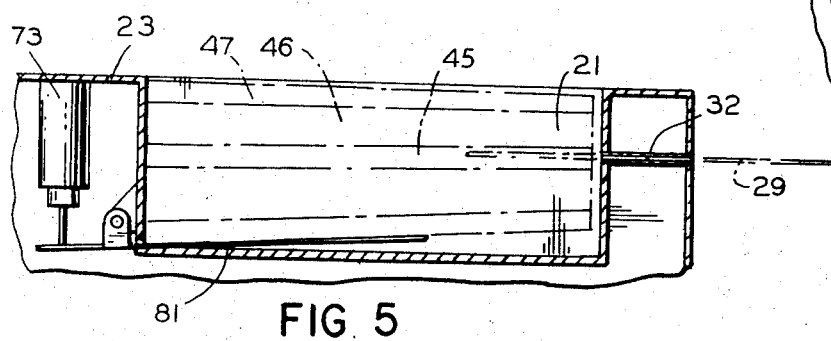
FIG. 5 is an enlarged, vertical sectional view of an apparatus forming an alternate embodiment of the invention.

The FIG. 5 embodiment of the apparatus is like that in FIGS. 1 – 3 and is identical to the apparatus of FIG. 1 except that instead of the feelers 31 and 61, the apparatus of FIG. 5 has a trip lever 81 incorporated in each pocket so that when an ear of corn drops in the pocket, the trip lever will actuate a control 73 to cause actuation of the solenoid valves in the air and hot water lines to open. However, when the trip lever 81 reaches position B in FIG. 1, it will engage a control arm (not shown) which will effect the retraction of the needle and discharge the ear.

FIG. 5A shows a hanger 75 having ends fitting through slots in the wall of the pocket 21 to releasably retain it in place. Such a device or equivalent device can be used to support the smaller end of the ear of corn in general alignment with the needle 29. Instead of the hanger 75, the floor of the pocket could be inclined so as to tend to support the ear of corn with its axis parallel to the axis of the drum 23 and in alignment with the needle 29.

I claim:
1. The method of blanching an ear of corn having an uncored pith portion comprising:
    subjecting the ear of corn to two independent blanching steps, one of which comprises applying a hot fluid to the exterior of an ear for a sufficient time to blanch the kernels without blanching the cob portion of the ear,
    and the other blanching step comprising at another time, independently of the said one blanching step, injecting a hot fluid under pressure into the pithy cob portion of the ear to blanch that portion of the ear.

* * * * *